United States Patent
Schmidt et al.

(10) Patent No.: US 6,734,957 B2
(45) Date of Patent: May 11, 2004

(54) VISIBLE LIGHT SENSOR MECHANISM FOR CONSTANT BRIGHTNESS PROJECTION SYSTEMS

(75) Inventors: Terry Schmidt, Wellesley (CA); John Parkin, Kitchener (CA)

(73) Assignee: Christie Digital Systems, Inc., Ontario (CA)

( * ) Notice: Subject to any disclaimer, the term of this patent is extended or adjusted under 35 U.S.C. 154(b) by 201 days.

(21) Appl. No.: 10/059,291

(22) Filed: Jan. 31, 2002

(65) Prior Publication Data

US 2003/0142296 A1 Jul. 31, 2003

(51) Int. Cl.[7] ............................... G01J 1/42; G01J 1/46
(52) U.S. Cl. ................... 356/218; 356/215; 356/226
(58) Field of Search ........................ 356/215, 218, 356/226, 236; 250/205, 228; 353/66, 31, 33, 84

(56) References Cited

U.S. PATENT DOCUMENTS

| | | | |
|---|---|---|---|
| 3,572,944 A | * | 3/1971 | Hanline et al. ............. 356/406 |
| 3,833,297 A | | 9/1974 | Swartz ......................... 353/85 |
| 4,842,404 A | | 6/1989 | Duda ........................... 356/218 |
| 5,264,905 A | * | 11/1993 | Cavanagh et al. ............. 356/6 |
| 5,537,203 A | | 7/1996 | Carr ............................ 356/236 |
| 5,650,843 A | | 7/1997 | Moberg et al. .............. 356/236 |
| 6,231,190 B1 | * | 5/2001 | Dewald ........................ 353/31 |

* cited by examiner

*Primary Examiner*—Frank G. Font
*Assistant Examiner*—Layla Lauchman
(74) *Attorney, Agent, or Firm*—Staas & Halsey LLP

(57) ABSTRACT

An apparatus for collecting and sensing light in a projector, comprising a cold mirror positioned directly in the incident light path from a lamp and illumination optics of the projector for reflecting a large portion of visible light towards a light imaging device while transmitting IR and UV light and a small portion of the visible light; a secondary mirror for reflecting the small portion of the visible light, an integrating box positioned to collect and integrate the small portion of visible light, a light tube in optical communication with the integrating box for further integrating and attenuating the small portion of visible light, and an electro-optic device within the light tube for measuring the small portion of visible light within the light tube and generating an electrical signal in response thereto.

13 Claims, 3 Drawing Sheets

VISIBLE LIGHT SENSOR MECHANISM FOR CONSTANT BRIGHTNESS PROJECTION SYSTEMS

FIELD OF THE INVENTION

The present invention relates in general to video projection systems, and more particularly to an apparatus for collecting and sensing light in projectors for use with constant intensity modes of projector operation.

BACKGROUND OF THE INVENTION

Video projectors require special lamps that are designed to project images of sufficiently high brightness levels to be discerned by the human eye. It is well known that optical brightness of projection lamps, and consequently the images projected thereby, diminishes with operational time and/or age of the lamps.

In order for a projector to maintain a constant brightness level over time, it is normally required to boost the lamp power by small increments in order to offset the diminishing lamp brightness. Automatic methods of increasing ballast power are known, which can be open loop systems or closed loop systems.

Open loop system designs of constant brightness lamp operation require an applied correction factor (of lamp power) that slowly increases the lamp power at a specified rate. One problem with such systems arises when the applied correction factor does not ideally match the brightness decay of a given lamp, with the result that the brightness level varies with time.

Closed loop system designs of constant brightness typically provide better results than open loop systems. Closed loop systems measure the lamp brightness in real-time and adjust the lamp power accordingly through software control. A typical closed loop system requires a light sensing instrument, a method of light measurement, and an electrical interface to the lamp ballast and control software.

In such closed loop systems, the method of light sampling and measurement of on-screen brightness has presented great difficulties.

Other prior art approaches to lamp brightness compensation are exemplified in the patent literature, as discussed below.

U.S. Pat. No. 3,833,297 to Swartz discloses a projector for use with film or transparencies. The projector automatically controls the projected brightness in response to the exposure of the film or to the density of the transparency. Sampling of the light is unobtrusive as only the light that is not transmitted through a focussing lens is sampled. An appropriate electrical circuit for automatic control of the brightness is also disclosed.

U.S. Pat. No. 4,842,404 to Duda discloses a laser beam power monitor having two sampling ports. Two wedge-shaped beam splitters perform obtrusive light sampling by reflecting portions of the laser beam into the sampling ports for detection by photodetectors. The light detected can be monitored for measurement or control purposes.

U.S. Pat. No. 5,537,203 to Carr discloses a diffusely reflecting polymeric material for an integrating sphere. Use of the integrating sphere for measurement of diffuse transmittance of, for example, scattering liquids, translucent films, topical creams and biological and other specimens is contemplated.

U.S. Pat. No. 5,650,843 to Moberg et al. discloses an apparatus for sampling of light, and feedback control of the light intensity from a light source in a photographic film scanner. Specifically, the system includes a light integrating cavity having a light input port, a slot for emitting integrated light and a feedback port for providing a sample of the integrated light. A fiber optic cable is disposed at the feedback port and receives integrated light from a small radiating surface area within the cavity.

SUMMARY OF THE INVENTION

The present invention provides a new method and mechanism of light collection that accurately represents and compensates for lamp brightness decay to maintain screen brightness. More particularly, a secondary mirror is placed behind a primary cold mirror. The primary cold mirror removes UV and IR radiation from illumination. The secondary mirror functions to reflect leaking visible light for collection and constant brightness control. The mechanism is used internally within the projector and is unobtrusive to the light being projected. The invention relies on the fact that the primary cold mirror is positioned directly in the incident light path, and that a small percentage of visible light (normally <4% leakage) is transmitted through the primary cold mirror.

There are two main aspects of the invention. Firstly, the secondary mirror is used to unobtrusively sample the main light beam. Secondly, an integrator box is used to uniformly sample the resultant unfocussed and extremely non-uniform light beam. The integrator box is preferably constructed to trap and attenuate infrared radiation and reflect visible light to sample the on-screen brightness.

While the use of an "integrating sphere" for sampling light is known from the prior art set forth above, none of the prior art discloses a "second" mirror element which is used to unobtrusively sample the main light beam. Nor does the prior art disclose the use of an integrator box to trap and attenuate infrared radiation and reflect visible light to sample the on-screen brightness.

BRIEF DESCRIPTION OF THE DRAWINGS

A detailed description of the preferred embodiment is set forth below with reference to the following drawings, in which.

DETAILED DESCRIPTION OF THE PREFERRED EMBODIMENT

Figure 1:
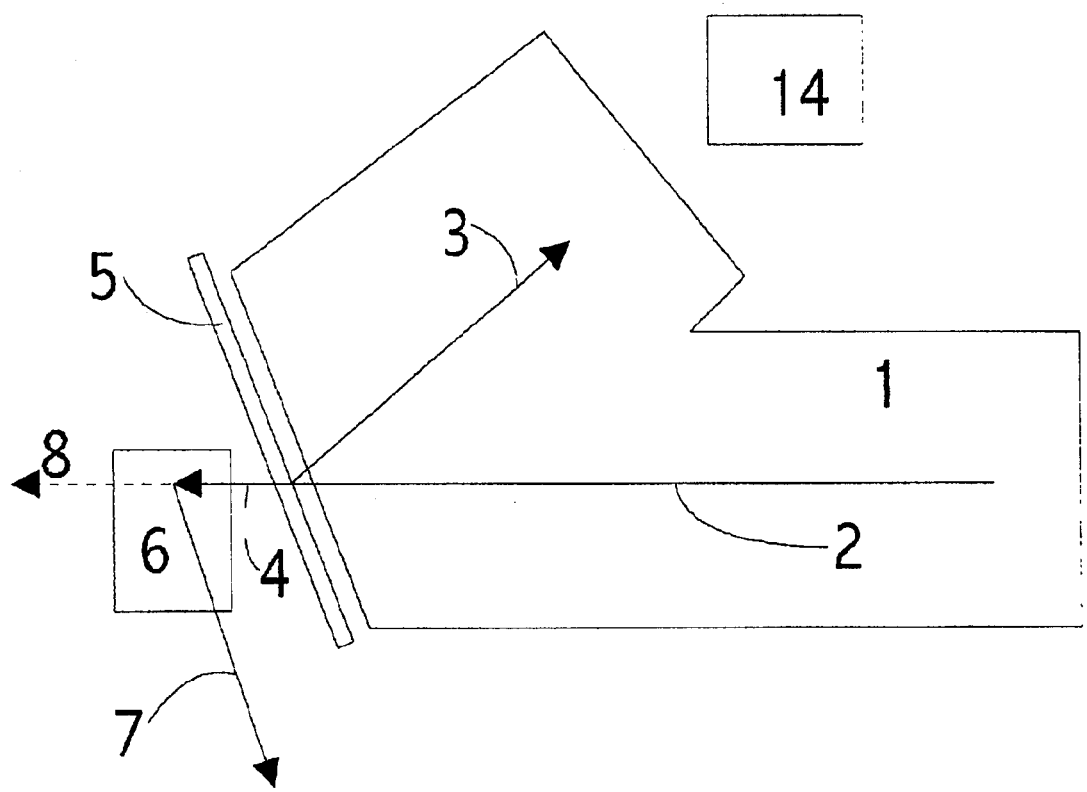
FIG. 1 is a schematic representation of a projector system incorporating primary and secondary cold mirrors of the light sensor mechanism according to the present invention.

Referring initially to FIG. 1 of the drawings, an illumination component 1 of the projector is shown for transmitting nearly parallel light 2 originating from the lamp and illumination optics. Primary cold mirror 5 is positioned to reflect most of the incident light 2 towards light imaging device 14 along the path 3. Path 4 represents transmitted IR and UV light and the percentage of visible light not reflected by the cold mirror, which is then incident upon a secondary mirror 6 which is preferably, although not necessarily, a cold mirror. It is preferred that the secondary mirror 6 be large enough to capture 10%–50% of the illumination light area. This is necessary to provide a sufficiently high signal to noise ratio. Furthermore the larger sampling area removes spatial variations in light intensity that may occur from lamp optical uniformity variations and alignment variations.

The energy transmitted through the cold mirror 6 is primarily composed of IR and UV radiation 8. Visible light 7 is reflected by the cold mirror 6 and directed towards an integrating box 9 which contains an optically diffuse inner surface (preferably white) used to integrate light for measurement.

Figure 2:
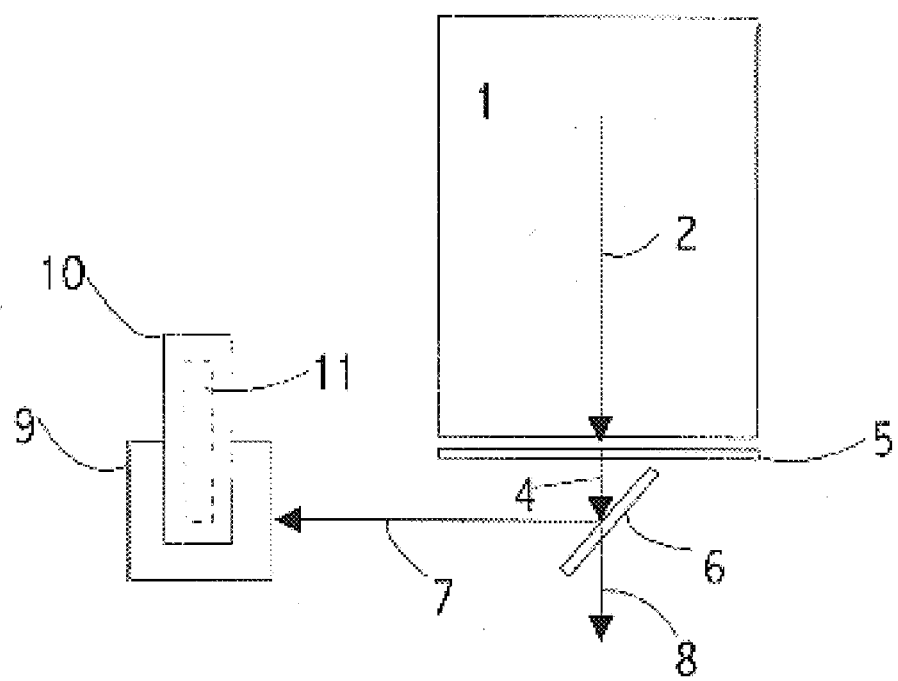
FIG. 2 is a schematic representation of the integrator box of the present invention for collecting the light passed thereto by the primary and secondary cold mirrors.

FIG. 2 shows visible, UV and IR light 4 being transmitted through cold mirror 5 for further reflection 7 from cold mirror 6 into integrating box 9. An electro-optic device 11 measures the visible light within a light tube 10. The visible light measured is converted into an electrical signal. The electrical signal is processes through software control and adjusts the lamp power to maintain the projector brightness, in accordance with well-known techniques. It is preferred that the integrating box be metal in nature (aluminium) to shield electronics within the box from IR radiation.

Figure 3:
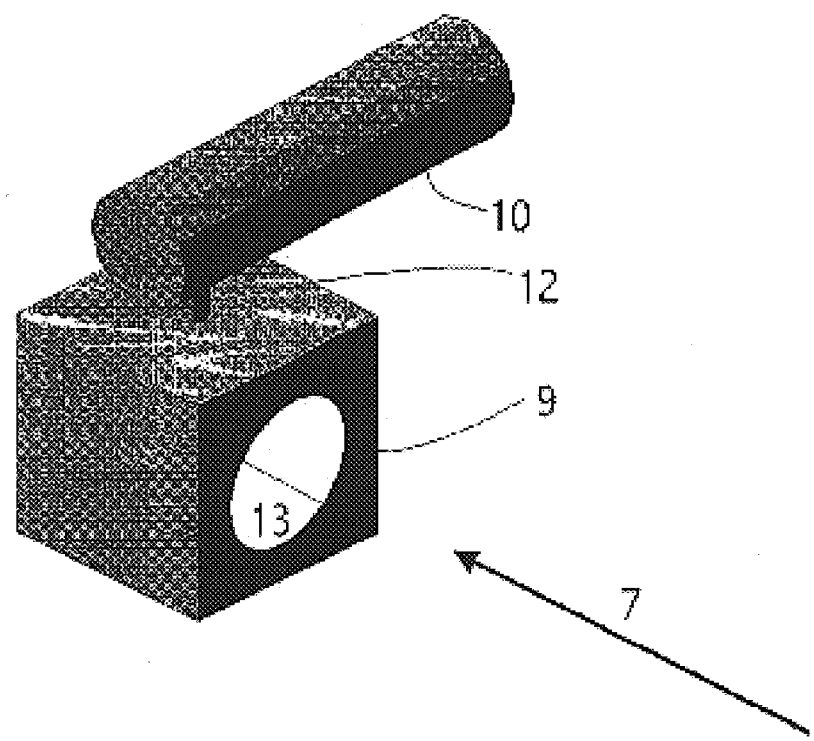
FIG. 3 is a perspective view of the integrator box of FIG. 2.

FIG. 3 illustrates the light integrating box 9 placed in position to accept visible light 7. The light tube 10 contains an IR rejecting plastic (Teflon) sleeve that is utilised to further integrate (i.e. make more uniform) the light by diffusing it from the inner surface, and also provides necessary attenuation of the incident light by careful arrangement of the tube length and inner diameter. An electro-optical device is disposed within the tube 10 which, in turn, is attached to the light integrating box 9 through a hollow fitting 12. It is preferred that the light tube 10 be constructed from metal to shield the contained electro-optical device from outside IR radiation and electronic RFI (Radio Frequency Interference). The IR attenuation provided by the plastic (Teflon) sleeve is important, as most silicon light sensors will saturate with the amount of light that 4% of the main projected beam represents. This effective, yet inexpensive solution is more economical than an IR cut filter placed over the sensor.

Figure 4:
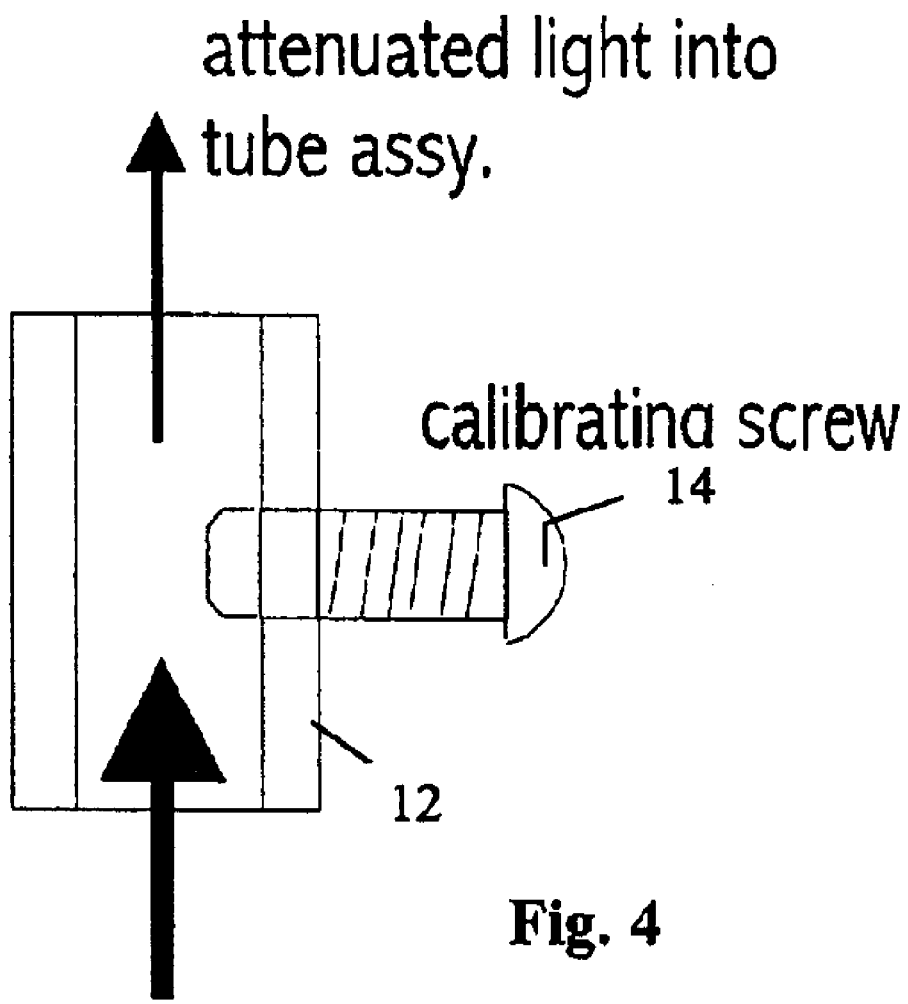
FIG. 4 is schematic representation of a mechanism for calibrating the integrator box of FIGS. 2 and 3.

Turning finally to FIG. 4, a method of calibrating the electro-optical light sensor is shown by adjusting a calibrating screw 14 disposed in the hollow fitting 12 until a desired reading is achieved. The calibrating screw can then be locked in place by means of Loctite or a locking screw, or other means. A calibrated lamp should be used before adjustment, in order to remove lamp output variation.

A person understanding the present invention may conceive of modifications or variations thereof, all of which are believed to be within the sphere and scope of the invention as defined by the claims appended hereto.

We claim:

1. An apparatus for collecting and sensing light in a projector, comprising:
    a primary mirror positioned directly in the incident light path from a lamp and illumination optics of said projector for reflecting a large portion of visible light towards a light imaging device while transmitting a small portion of said of visible light;
    a secondary mirror for reflecting said small portion of said visible light;
    an integrating box positioned to collect and integrate said small portion of visible light; and
    an electro-optic device for measuring said small portion of visible light and generating an electrical signal in response thereto.

2. The apparatus of claim 1, further comprising a light tube in optical communication with said integrating box for further integrating and attenuating said small portion of visible light.

3. The apparatus of claim 1, wherein said integrating box contains an optically diffuse inner surface integrating said small portion of visible light.

4. The apparatus of claim 3, wherein said optically diffuse inner surface is white in colour.

5. The apparatus of claim 1, wherein said integrating box is constructed of metal in order to provide a radiation shield.

6. The apparatus of claim 1, wherein said primary mirror is a cold mirror.

7. The apparatus of claim 1, wherein said secondary mirror is a cold mirror.

8. The apparatus of claim 1, wherein said secondary mirror is sufficiently large to capture approximately 10%–50% of the illumination light area provided by said small portion of said visible light reflected by said primary mirror.

9. The apparatus of claim 2, wherein said light tube contains an IR rejecting plastic for diffusing said small portion of visible light from an inner surface thereof.

10. The apparatus of claim 9, wherein said light tube is constructed from metal to shield said electro-optical device from radiation.

11. The apparatus of claim 1, wherein said integrating box and said light tube are optically connected by a hollow fitting.

12. The apparatus of claim 11, wherein said hollow fitting further includes a calibrating screw for calibrating said electro-optic device.

13. The apparatus of claim 1, wherein said primary mirror transmits less than approximately 4% of said visible light.

\* \* \* \* \*